US011980786B2

(12) United States Patent
Scheffers et al.

(10) Patent No.: US 11,980,786 B2
(45) Date of Patent: *May 14, 2024

(54) PROPORTIONER FOR A FIRE PROTECTION SYSTEM

(71) Applicant: Minimax Viking Research & Development GmbH, Bad Oldesloe (DE)

(72) Inventors: Derek John Scheffers, Mattawan, MI (US); Marc Serge Ferere, Washington, DC (US); Shawn J. Feenstra, Caledonia, MI (US)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,090

(22) Filed: Jan. 26, 2023

(65) Prior Publication Data

US 2023/0264056 A1 Aug. 24, 2023

Related U.S. Application Data

(63) Continuation of application No. 15/930,052, filed on May 12, 2020, now Pat. No. 11,596,821.

(Continued)

(51) Int. Cl.

| | |
|---|---|
| ***A62C 5/02*** | (2006.01) |
| ***A62C 5/00*** | (2006.01) |
| ***A62D 1/02*** | (2006.01) |

(52) U.S. Cl.

CPC .............. *A62C 5/024* (2013.01); *A62C 5/002* (2013.01); *A62D 1/0078* (2013.01)

(58) Field of Classification Search

CPC .. A62C 5/00; A62C 5/002; A62C 5/02; A62C 5/022; A62C 5/024; A62C 5/027;

(Continued)

(56) References Cited

U.S. PATENT DOCUMENTS 2,480,925 A 9/1949 Hirst
2,575,469 A * 11/1951 Rider .................... F16K 31/385 169/22

(Continued)

FOREIGN PATENT DOCUMENTS

JP 2001-276254 10/2001

OTHER PUBLICATIONS

International Searching Authority, International Search Report and Written Opinion in International Appln. No. PCT/US2020/032653, Jul. 22, 2020, 11 pages.

(Continued)

*Primary Examiner* — Darren W Gorman

(74) *Attorney, Agent, or Firm* — Perkins Coie LLP

(57) ABSTRACT

A proportioner having a body portion that defines a foam passage and a fluid passage. The proportioner also includes a restrictor assembly having a restrictor disk and an orifice plate having an opening for receiving the restrictor disk. The proportioner can further include a rod member connected to the restrictor disk and a clapper assembly connected to the rod member via a sliding interface. The clapper assembly can be configured to control a flow of the foam concentrate through the foam passage in proportion to a flow of the fire protection fluid through the fluid passage by moving the rod member to vary the distance between the restrictor disk and the orifice plate. The sliding interface can be disposed between a first guide and a second guide, and at least a portion of the restrictor disk is disposed in the opening.

27 Claims, 9 Drawing Sheets

Related U.S. Application Data

(60) Provisional application No. 62/848,192, filed on May 15, 2019.

(58) Field of Classification Search
CPC ......... A62C 99/0036; F16K 1/38; F16K 1/54; B01F 23/451; B01F 25/31114; B01F 25/314; B01F 35/8331; G05D 11/003; Y10T 137/2514
See application file for complete search history.

(56) References Cited

U.S. PATENT DOCUMENTS

| | | | | |
|---|---|---|---|---|
| 3,141,471 | A | 7/1964 | Williamson | |
| 3,547,409 | A * | 12/1970 | Jacuzzi | B01F 25/31114 366/167.1 |
| 3,647,002 | A * | 3/1972 | Lindsay | B01F 25/31114 137/98 |
| 3,750,754 | A | 8/1973 | Stults | |
| 7,140,552 | B1 | 11/2006 | Crabtree | |
| 2004/0050556 | A1 | 3/2004 | Baker et al. | |
| 2005/0034758 | A1 | 2/2005 | Bron | |
| 2013/0032236 | A1 * | 2/2013 | Ringer | A62C 35/68 137/871 |
| 2015/0258356 | A1 | 9/2015 | Sulmone | |
| 2016/0346576 | A1 | 12/2016 | Hammer | |

OTHER PUBLICATIONS

Chemguard. 3% × 3% AR-ARFF. May 7, 2018 (May 7, 2018) [retrieved on Jun. 29, 2020]. Retrieved from internet: <URL: https://web.archive.org/web/20180507231427/http:/www.chemguard.com/fire-suppression/catalog/foam-concentrates/alcohol-resistant-aqueous-film-forming-foam-ar-aff/c333.aspx>entire document.

Tyco Fire Protection Products, Datasheet, Ansul Flowmax PPW Variable Range Proportioners, Form 2013111-02, 2017, 4 pages.

Tyco Fire Protection Products, Datasheet, Ansul Flowmax CL Variable Range Proportioners, Form 2005165-05, 2017, 4 pages.

K.C. Antincendi S.r.l., Product Sheet, KCA Proportioning Devices Wide-Range Proportioners I KWR Wide-Range Proportioner, Form SP2.3.2.2a, 0417, Date Unknown, 2 pages.

K.C. Antincendi S.r.l., Product Sheet, KCA Proportioning Devices ILBP I Balanced Proportioners I BKR Balanced Proportioner, Form SP2.3.2.4, 0417, Date Unknown, 1 page.

K.C. Antincendi S.r.l., Product Sheet, KCA Proportioning Devices ILPB I Balanced Proportioners I BKWR Wide-Range Balanced Proportioner, Form SP2.3.2.5, 0417, Date Unknown, 1 page.

K.C. Antincendi S.r.l., KCA Wide Range Mixer with confidential information redacted, including date, 1 page.

* cited by examiner

PROPORTIONER FOR A FIRE PROTECTION SYSTEM

PRIORITY CLAIM & INCORPORATION BY REFERENCE

This application is a continuation of U.S. patent application Ser. No. 15/930,052, filed May 12, 2020 which claims the benefit of U.S. Provisional Application No. 62/848,192 filed May 15, 2019, each of which is incorporated by reference in its entirety.

TECHNICAL FIELD

The present disclosure relates to a foam-based fire protection system and, more particularly, to a proportioner for injecting foam concentrate into the fluid stream of the fire protection system.

BACKGROUND ART

Fire protection systems that use foam-based solutions typically inject a foam concentrate into a fluid stream (e.g., water stream) that is directed to sprinkler heads, monitors, nozzles, or other fire-fighting fluid discharge devices. Depending on the type of foam and/or the type of fire-fighting application, the concentration of the foam in the foam solution can be 1%, 2%, 3%, 6%, or some other desired percentage. "Fire protection solution" or "solution" as used herein means a mixture of foam concentrate and fire protection fluid (e.g., water). In some conventional systems, a proportioner that mixes the foam concentrate and the fire protection fluid (e.g., water) is used to ensure that the concentration of foam in the fire protection solution is at the proper ratio or percentage.

In typical fire protection applications, the flow rate of the firefighting solution can vary depending on the number of fire protection devices that are in operation. For example, the flow rate of the fire protection solution in some sprinkler systems can range from 50 gallons per minute(gpm) to 3000 gpm or higher depending on the number of sprinklers that have opened due to a fire. The flow rate can initially start at 50 gpm and progressively increase if the fire expands and opens more sprinklers. To this end, the proportioner must be capable of providing the proper percentage (e.g., 1%, 2%, 3%, 6%, or some other desired value) of foam concentrate to within a predetermined range in the fire protection solution for the designed range of flow rates for the fire protection system. Failure to maintain the desired foam concentrate percentage within the predetermined range can result in the fire protection system not meeting recognized standards for fire protection systems and/or the foam concentrate supply can be exhausted before the fire is addressed (e.g., extinguished). For example, if the proper foam concentrate percentage is not maintained, the fire protection system may not be compliant with the drain time and foam expansion value criteria of the Foam Quality Tests section of the UL 162 standard for a Type III nozzle and a foam concentrate, as published in "UL 162, Standard For Safety: Foam Equipment and Liquid Concentrates" dated Feb. 23, 2018 (hereinafter "UL standard") and incorporated herein by reference in its entirety, and with the drain time and foam expansion ratio criteria of the Low Expansion Foam Concentrate Extinguishing Performance section in the FM 5130 standard for a foam concentrate, as published in "Approval Standard for Foam Extinguishing Systems: Class Number 5130" dated January 2018 (hereinafter "FM standard") and incorporated herein by reference in its entirety.

A conventional proportioner can include a body with a first passage for the foam concentrate and a second passage for the fire protection fluid. The conventional proportioner can also include a restrictor assembly with a restrictor disk and orifice plate for controlling a flow of the foam concentrate. The restrictor disk is connected to a rod that can be moved by a clapper assembly to control the flow of the foam concentrate. Some conventional proportioners include a guide assembly with upper and lower guides to align the restrictor disk to the opening in the orifice plate. Conventional proportioners, however, can be affected by the viscosity of the foam concentrate such that the fire protection system is not able to meet UL and FM standards for certain flows. For example, a conventional 6-inch proportioner in a system using an alcohol resistant (ARC) foam concentrate may be limited to certain flow rates depending on the viscosity of the foam concentrate. To meet FM and/or UL standards, the fire protection system having the 6-inch proportioner may be limited to fire protection solution flow rates in a range between 750 GPM to 2300 GPM when using high-viscosity foam concentrates, e.g., viscosity of about 2400 mPas, rather than a full range of the proportioner, which can be, for example, 30 gpm to 2000 gpm for an exemplary six-inch proportioner, 50 gpm to 3000 gpm for an exemplary eight-inch proportioner, or some other range that corresponds to the full range of the proportioner. As used herein "high-viscosity" means a value greater than 1300 mPas at 25 degrees C. using a Brookfield LV spindle 4 at 60 rpm. That is, it is believed that conventional proportioners are not able to maintain the foam concentration at a proper percentage value or range to meet UL or FM standards for the full flow range of the proportioner when using high-viscosity foam concentrates. The flow of the foam concentrate into the fire protection fluid is typically controlled by the restrictor disk that obstructs the concentrate flow through an opening in the orifice plate. As the restrictor moves away from the opening, the concentrate flow increases. In some conventional proportioners, the restrictor does not go through the opening in the orifice plate. It is believed that such a configuration could limit the ability to precisely control the foam concentrate flow, especially for high-viscosity foam concentrates. In some conventional proportioners, the restrictor is configured to go through the opening in the orifice plate, but it is believed that the foam concentrate passage in such proportioners does not allow for proper flow of high-viscosity foam concentrates into the fluid flow, which can limit the proportioner to a limited flow range and/or the foam concentrates to those with a lower viscosity. Consequently, there is a need for a proportioner that can maintain the foam concentrate percentage in a firefighting solution at the proper value for a wide range of flow rates when using high-viscosity foam concentrates. "Wide range" as used herein means that a maximum rated flow rate for the proportioner is equal to or greater than 10 times the minimum rated flow rate for the proportioner.

Further limitations and disadvantages of conventional, traditional, and proposed approaches will become apparent to one skilled in the art, through comparison of such approaches with embodiments of the present invention as set forth in the remainder of the present disclosure with reference to the drawings.

SUMMARY OF THE INVENTION

Preferred embodiments are directed to a proportioner that can control the percentage of a foam concentrate in a fire protection solution to within a variation that satisfies UL and/or FM standards for a wide range of fire protection solution flows and/or for high-viscosity foam concentrates. In some embodiments, a proportioner includes a body portion that defines a foam passage for transporting a foam concentrate and a fluid passage for transporting a fire protection fluid (e.g., water). Preferably, a ratio of a cross-sectional area of the outlet of the fluid passage to a cross-sectional area of the outlet of the foam passage is 11 or less, and more preferably 10 or less. In some embodiments, the ratio can be in a range of 1 to 11, more preferably in a range of 2 to 10, and even more preferably in a range of 2 to 4. The proportioner can include a restrictor assembly having a restrictor disk and an orifice plate to control a flow of the foam concentrate through the foam passage. Preferably, the restrictor assembly is configured such that the flow of the foam concentrate through the foam passage is based on a distance of a base of the restrictor disk from the orifice plate. In some embodiments, the restrictor disk is configured to be disposed in an opening of the orifice plate and, as the distance between the base of the restrictor disk and the orifice plate increases, a cross-sectional area of an annulus defined by an outer surface of the restrictor disk and an interior surface of the opening increases. In some embodiments, the restrictor assembly maintains the annulus for the full travel range of the restrictor disk. That is, some portion of the restrictor disk remains disposed within the opening of the orifice plate for the full travel range of the restrictor disk.

In some embodiments, the proportioner can also include a rod member connected to the restrictor disk. The proportioner can have first and second guides that are configured to accept the rod member. Preferably, the first guide and the second guide are disposed in the body portion to position the rod member so as to align the restrictor disk to the orifice plate. The proportioner can further include a clapper assembly that is connected to the rod member via a sliding interface. Preferably, the clapper assembly is configured to control a flow of the foam concentrate through the foam passage in proportion to a flow of the fire protection fluid through the fluid passage. In some embodiments, the flow of the foam concentrate is controlled by moving the rod member to vary the distance between the restrictor disk and the orifice plate. Preferably, the sliding interface is disposed between the first guide and the second guide. In some embodiments, the restrictor disk includes a tapered section and a slope of the taper has an angle in a range of 60 degrees to 85 degrees with respect to a base of the restrictor disk. Preferably, the taper angle is based on the size of the proportioner. For example, the taper angle can be 70±2 degrees for an exemplary eight-inch proportioner and 75±2 degrees for an exemplary six-inch proportioner.

In some embodiments, the clapper assembly is configured to move the rod member so as to maintain a percentage of the foam concentrate in a fire protection solution, which is a mixture of the foam concentrate and the fire protection fluid, to within a variance that satisfies UL and/or FM standards. The foam concentrate percent variation satisfying the UL and/or FM standards can be maintained for fire protection solution flows that are between 30 gpm to 2000 gpm in some embodiments and between 50 gpm and 3000 gpm in other embodiments.

In some embodiments, the proportioner maintains the foam concentrate percent variation satisfying the UL and/or FM standards for high-viscosity foam concentrates. Preferably, a viscosity of the foam concentrate is greater than 1300 mPas, and more preferably greater than or equal to 1500 mPas. Viscosity values provided herein are measured at 25 degrees C. using a Brookfield LV spindle 4 at 60 rpm. In some embodiments, the viscosity of the foam concentrate is less than or equal to 3500 mPas and preferably, the viscosity of the foam concentrate is in a range between 1500 mPas to 3500 mPas, and more preferably in a range between 2000 mPas to 3000 mPas.

Another exemplary embodiment is directed to a method of mixing foam concentrate and fire protection fluid. The method includes transporting the foam concentrate from a foam concentrate source to piping in a fire system and transporting the fire protection fluid to the piping. The method also includes controlling a percentage of the foam concentrate in the fire protection solution to within a variance that satisfies UL and/or FM standards. Preferably, the foam concentrate percent variation satisfying the UL and/or FM standards is maintained for fire protection solution flows that are between 30 gpm to 2000 gpm in some embodiments and between 50 gpm to 3000 gpm in other embodiments. In some embodiments, the foam concentrate percent variation satisfying the UL and/or FM standards can be maintained for high-viscosity foam concentrates. For example, a viscosity of the foam concentrate can be greater than 1300 mPas, and preferably greater than or equal to 1500 mPas. Preferably, the viscosity of the foam concentrate is less than or equal to 3500 mPas, and more preferably, the viscosity of the foam concentrate is in a range between 1500 mPas to 3500 mPas, and more preferably in a range between 2000 mPas to 3000 mPas.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

DETAILED DESCRIPTION

Various embodiments of the present technology generally relate to a proportioner that can control a percentage of a foam concentrate in a fire protection solution to within a variation that satisfies UL and/or FM standards for a wide range of fire protection solution flows. In some embodiments, the proportioner controls the foam concentrate percent variation satisfying the UL and/or FM standards for a wide range of fire protection solution flowrates using high-viscosity foam concentrates.

Figure 1A:
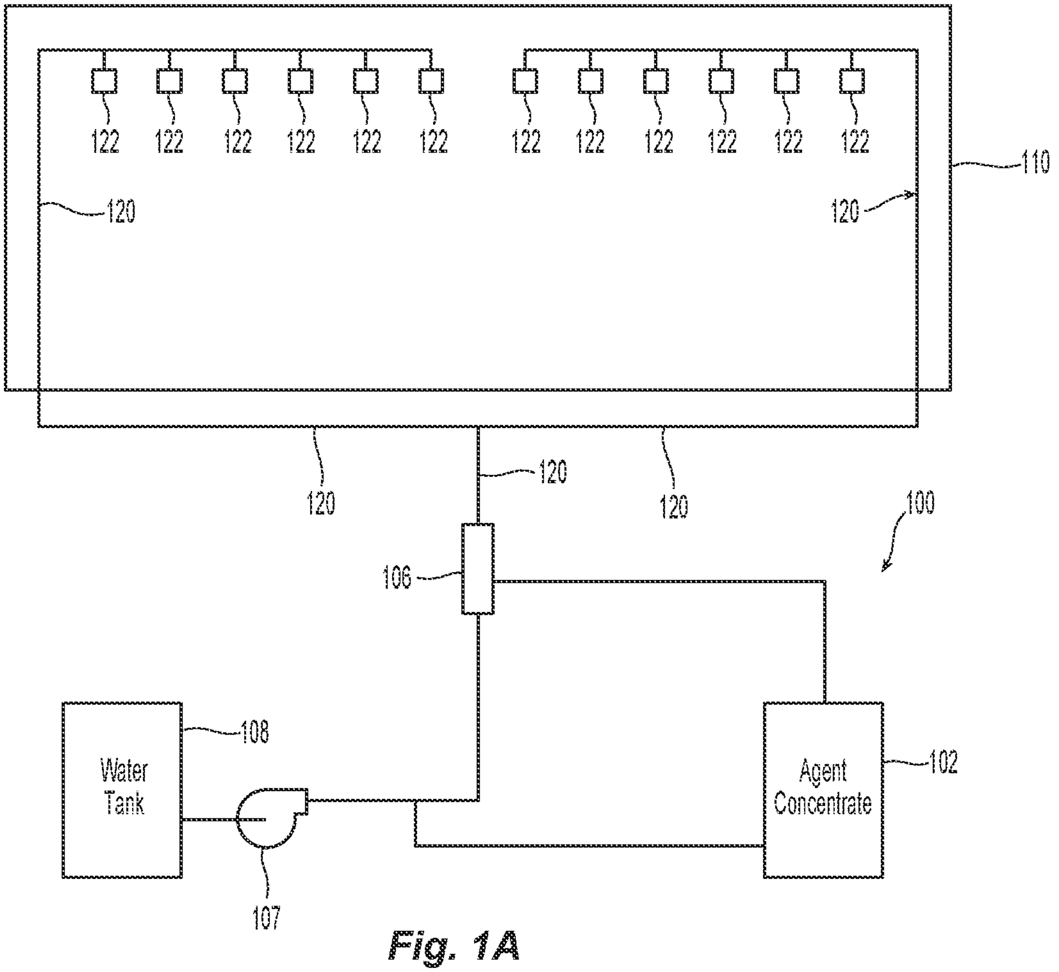
FIG. 1A is a schematic of a sprinkler system with a proportioner according to an embodiment of the present disclosure.

FIG. 1A illustrates an embodiment of the present disclosure in which a fire protection system includes a proportioner. Protected area 110 can be any enclosure, area, or equipment that needs protection from a fire. For example, protected area 110 can be a warehouse, a building, a room, an aircraft deck, a runway, a loading dock to name just a few. Protected area 110 is protected by a fire protection system 100 that can include a fluid storage tank 108 (or another source of fluid) and a pump 107 for transferring the fluid (e.g., water) to one or more discharge devices (e.g., sprinklers, monitors, nozzles, or some other discharge device) that discharge fire protection solution to the protected area 110 in case of a fire. Preferably, the fire protection system 100 can also include a concentrate storage tank 102 for storing a fire suppressing foam concentrate that can be mixed with the fluid (e.g., water) to form a fire protection solution. Preferably, the fire protection solution is an aqueous film-forming foam (AFFF) solution, a film forming fluoroprotein foam (FFFP) solution, an alcohol resistant concentrate (ARC) solution, a fluoroprotein foam (FP) solution, or another fire protection solution. In some embodiments, the foam concentrate is a C6-based fluorochemical concentrate. The concentrate storage tank 102 can be, for example, a bladder-type tank such that pressure on the bladder from an external source will force the foam concentrate out the discharge of the tank. Of course, other types of discharge tanks can also be used. A proportioner 106 can be disposed in the discharge line of the pump 107 between the pump 107 and the discharge devices. The proportioner 106 receives the foam concentrate from the concentrate storage tank 102 and introduces a controlled flow of the foam concentrate into the fluid flow from the pump 107.

When fire protection system 100 is activated (e.g., due to a fire in the protected area 110 or for some other reason), the pump 107 is turned on to transfer fluid (e.g., water) to the protected area 110 via the proportioner 106. A portion of the fluid from the pump 107 can be diverted to the concentrate storage tank 102 to pressurize the tank and force the foam concentrate to the proportioner 106. Of course, other methods such as, for example, a pump for the concentrate, a pressured concentrate storage tank, and/or another method to transfer the concentrate to the proportioner 106 can be used. Preferably, the proportioner 106 mixes the fire protection fluid (e.g., water) and foam concentrate to form a fire protection solution. Typically, the foam concentrate is formulated to mix with the fire protection solution at a mixture corresponding to the foam percentage rating of the foam concentrate (also referred to herein as "rated foam concentrate percentage"), which can be, for example, 1%, 2%, 3%, 6% or some other chosen percentage.

Figure 1B:
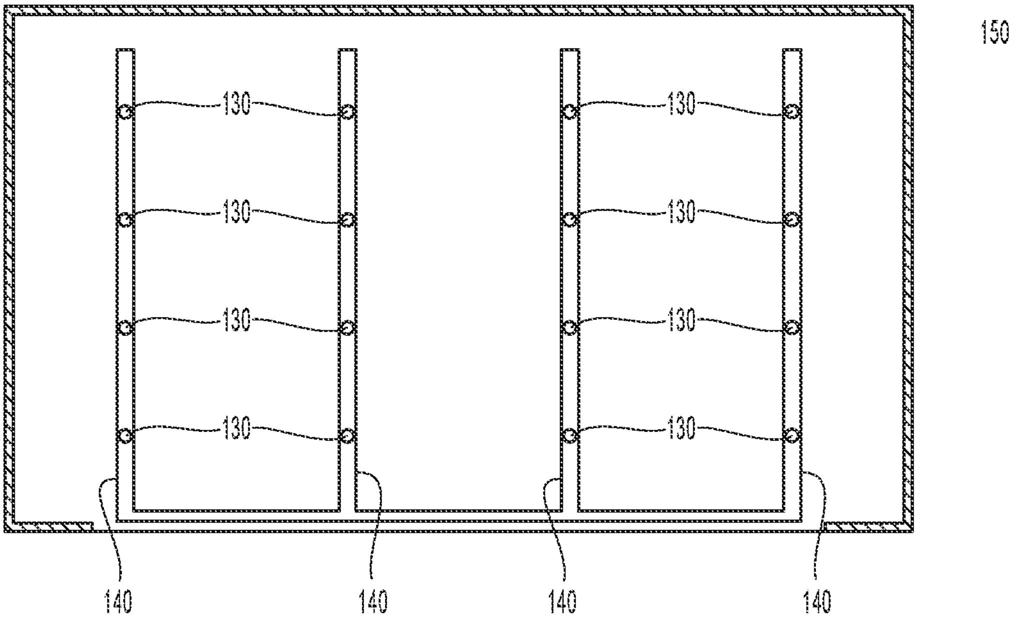
FIG. 1B is a schematic of a fire protection solution with trench-installed spray-type fire protection nozzle assemblies according to an embodiment of the present disclosure.

After being mixed by the proportioner 106, the fire protection solution is directed to the protected area 110 via piping system 120. In some embodiments, for example, as seen in FIG. 1A, the fire protection solution is directed to sprinklers 122, which discharge the fire protection solution in the protected area 110. However, in other embodiments, the fire protection solution can be directed to fire protection nozzles (e.g., floor nozzles, trench-mounted nozzles, or some other type of nozzle), monitors, or some other appropriate device that discharges fire protection solution. For example, as seen in FIG. 1B, the fire protection solution is directed to spray-type fire protection nozzle assemblies 130 can be installed in trenches 140 of an aircraft hangar 150 (or another vehicle loading and/or storage area). As seen in FIG. 1B, spray-type fire protection nozzle assemblies 130 can be installed in trenches 140 throughout the hangar 150. Preferably, the nozzle assemblies 130 can be configured to discharge the fire protection solution in a 360-degree pattern to cover the floor area of the hangar. Of course, depending on the shape, size, installation, and/or other criteria concerning the deck area to be protected, those skilled in the art understand that any combination of nozzle assemblies 130 (e.g., 90-degree nozzles, 180-degree nozzles, 360-degree nozzles, and/or other nozzle configurations) can be installed to protect the deck area of an aircraft landing and/or storage area.

When the fire protection system 100 is activated, the flow through the piping system 120 can vary based on the number of discharges devices (e.g., sprinklers, nozzles, monitors, or some other discharge devices) that are active. For example, depending on the number of discharge devices that are open, the fire protection solution flow to the protected area 110 via the proportioner 160 can vary from less than 50 gpm to 3000 gpm or higher for an exemplary eight-inch proportioner and from less than 30 gpm to 2000 gpm or higher for an exemplary six-inch proportioner. As the fluid flow varies, the percentage of the foam concentrate in the fire protection solution must be maintained at the rated foam concentrate percentage. For example, for a 3% foam concentrate, the fire protection solution ideally has a mixture of 3% foam concentrate and 97% fluid (e.g., water), and an ideal proportioner maintains the foam concentrate percentage at a constant 3% even as the fluid flow varies. In practicality, however, the foam concentrate percentage in the fire protection solution can vary as the flow of the fluid flow varies. In practice, as the fluid flow varies during operation of the fire protection system, the proportioner should maintain any variation in foam concentrate percentage to within a range that still provides effective fire protection. "Effective fire protection" as used herein is protection of a fire that satisfies UL and/or FM standards. However, conventional proportioners are only able to provide effective fire protection for fire protection solution flows between 750 gpm and 2300 gpm and only for foam concentrates having viscosities that are about 1000 mPas or less. That is, conventional proportioners are not able to maintain the foam concentrate percentages to within a range that still provides effective fire protection for a wide range of flows and/or for high-viscosity foam concentrates.

In exemplary embodiments of the present disclosure, the proportioner 106 controls a percentage of the foam concentrate in the fire protection solution to within a variance that provides effective fire protection (this variance is also referred to herein as the "target concentration"). The target concentration can be based on the rated foam concentrate percentage (e.g., 1%, 2%, 3%, 6% or some other chosen percentage). Preferably, the target concentration is a range having a lower foam concentrate percent value and an upper foam concentrate percent value that are based on the rated foam concentrate percentage. For example, the lower value can be the rated foam concentrate percentage minus a first value and the upper value can be the rated foam concentrate percentage plus a second value. In some embodiments, the first value can be 0 and the second value can be 0.9% or 0.3 times the rated foam concentrate percentage, whichever is lesser. For example, for a rated foam concentrate percentage of 1%, the target concentration can have a lower value of 1% (1%−0) and an upper value of 1.3% (1%+(0.3*1%)). Similarly, the target concentration can be a range between 2% to 2.6% for a 2% foam concentrate, between 3% to 3.9% for a 3% foam concentrate, and between 6% to 6.9% (6%+0.9%) for a 6% foam concentrate, to name just a few. Preferably, the proportioner 160 can maintain the target concentration for a wide range of flows and, more preferably, maintain the target concentration using high-viscosity foam concentrates.

Figure 2B:
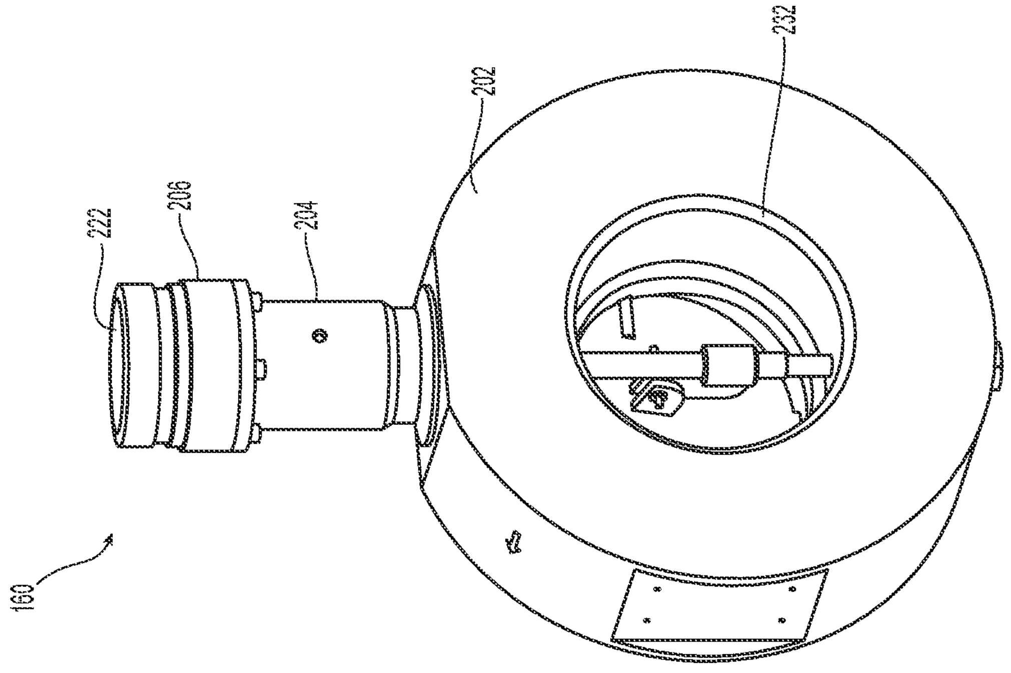
FIG. 2B is a perspective view of an inlet side of the preferred proportioner of FIG. 2A.
Figure 2A:
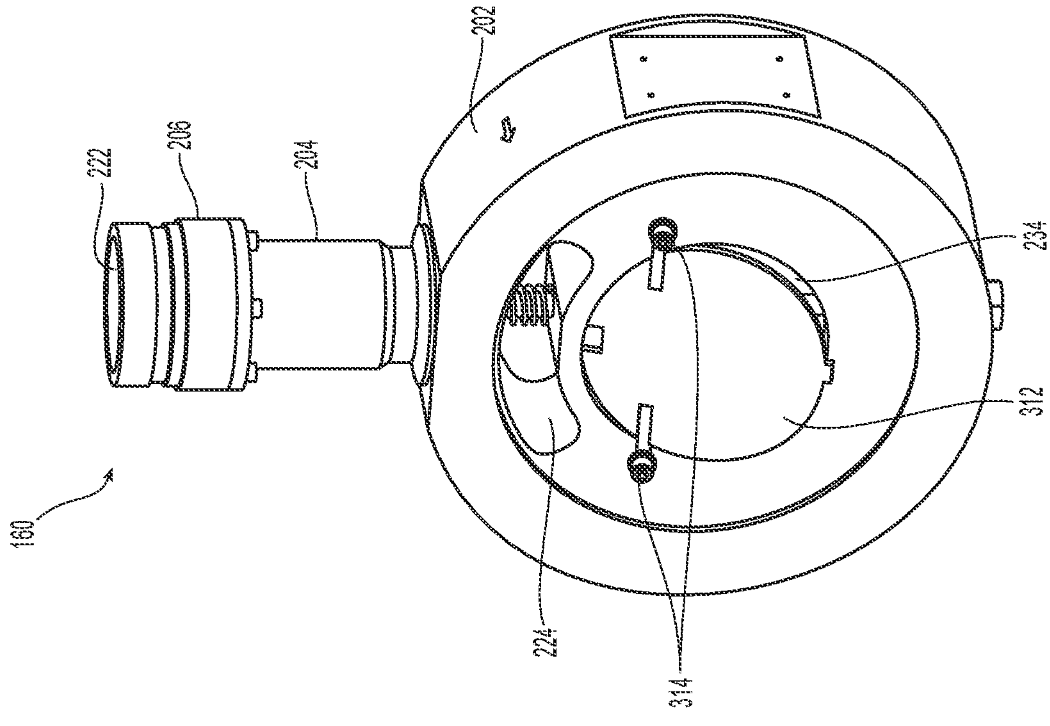
FIG. 2A is a perspective view of an outlet side of a preferred proportioner for use in the system of FIG. 1.

FIG. 2A illustrates a perspective view of an outlet side of proportioner 160, and FIG. 2B illustrates a perspective view of an inlet side of the proportioner 160. As seen in FIGS. 2A and 2B, the proportioner 160 preferably includes a body portion 202, a neck portion 204, and a coupling portion 206. Preferably, the body portion 202 can have a wafer-type body that is configured to fit between the two flanges of the inlet piping and outlet piping. The proportioner 160 is sealed when the flanges of the inlet and outlet piping are bolted together with the proportioner 160 in the middle. In some embodiments, the proportioner can also be flanged and the connections to the inlet piping and outlet piping are done via flanged interfaces.

The body portion 202 preferably defines a fluid through passage 230 (also referred to herein a "fluid passage 230") that provides a flow path for the fire protection fluid (e.g., water). The fluid passage 230 includes an inlet 232 (see FIG. 2B) for receiving the fire protection fluid (e.g., water) from the pump 107 and a fluid outlet 234 (see FIG. 2A) that can be connected to the piping system 120. The body portion 202 preferably also defines foam through passageway 227 that provides a flow path for the foam concentrate. In some embodiments, for example, as seen in FIG. 2B, the neck portion 204 and/or the coupling portion 206 can also define respective foam through passageways 226, 225 that connect to the other foam through passages to provide a flow path for the foam concentrate. A foam through passage 220 (also referred to herein as "foam passage 220") is preferably formed from one or more of foam through passageways 225, 226 and 227, which are respectively defined by the coupling portion 206, neck portion 204, and body portion 202. Preferably, the coupling portion 206 is configured to connect to piping from the concentrate storage tank 102 via a grooved coupling. However, the type of connector is not limiting and some embodiments of the proportioner can have a flanged interface (or another type of connection). The coupling portion 206 preferably connects to the neck portion 204 by, for example, grooved coupling, flanged fitting, threads, press-fit, welding, or some other fastening means. The neck portion 204 can be connected to the body portion 202 by, for example, grooved coupling, flanged fitting, threads, press-fit, welding, or some other fastening means.

The foam concentrate from the concentrate storage tank 102 enters the foam inlet 222, which can be defined by the coupling portion 206, and flows into the passageway 225 of the coupling portion 206. The foam concentrate then flows into the passageway 226 of the neck portion 204 from the passageway 225. Preferably, the foam concentrate flows from the passageway 226 of the neck portion 204 and into the passageway 227 of the body portion 202. The foam concentrate preferably exits the passageway 227 via foam outlet 224, which is defined by the body portion 202. Thus, in some embodiments, the passageways 225, 226, 227 interconnect to form the foam passage 220.

Preferably, the foam outlet 224 of the foam passage 220 and the fluid outlet 234 of the fluid passage 230 are connected to the piping system 120 such that fluid from the fluid passage 230 and foam concentrate from the foam passage 220 mixes in the piping system 120 on the outlet side of the proportioner 160 to form a fire protection solution. In some embodiments, the fluid (e.g., water) flowing from fluid outlet 234 creates a venturi effect such that the fluid and the foam concentrate flowing from foam outlet 224 are mixed thoroughly in piping system 120 as the fire protection solution is sent to, e.g., the sprinklers 122. Preferably, a ratio of a cross-sectional area of the fluid outlet 234 to a cross-sectional area of the foam outlet 224 (see FIG. 3B) is 11 or less, more preferably 10 or less. In some embodiments, the ratio can be in a range of 1 to 11, more preferably in a range of 2 to 10, and even more preferably in a range of 2 to 4. As discussed further below, the flow of the foam concentrate and thus the foam concentrate percentage in the fire protection solution can be regulated by a proportioning assembly that can be disposed at least partially within the foam passage 220. Of course, the pressure used to discharge the foam concentrate from concentrate storage tank 102 and/or the venturi effect due to the fluid flow through the proportioner 160 also affect the flow of the foam concentrate into the fire protection solution. Preferably, as the fire protection fluid flow changes, the proportioner 160, the pressure used to discharge the foam concentrate, and/or the venturi effect ensure that the foam concentrate in the fire protection solution is within the target concentration.

In some embodiments, the proportioner 160 is configured to vary the flow of the foam concentrate through the foam passage 220 in proportion to the flow rate of the fluid (e.g., water) through the fluid passage 230. Preferably, the proportioner 160 controls the flow of the foam concentrate such that any variation in the foam concentrate percentage in the fire protection solution falls within the target concentration for a wide flow range of the fire protection solution. In some embodiments, the foam concentrate percentage falls within the target concentration for a rated flow range of the proportioner 160. Preferably, the maximum rated flow for the proportioner 160 is at least 60 times the minimum rated flow for the proportioner 160 (e.g., a rated flow range from 50 gpm to 3000 gpm for an exemplary eight-inch proportioner, from 30 gpm to 2000 gpm for an exemplary six-inch proportioner, or some other rated flow range). For example, for a fire protection solution having a 3% foam concentrate, the proportioner 160 can meet a target concentration that is between 3% to 3.9% for a wide range of flows for the proportioner 160. Preferably, the proportioner 160 meets the target concentration for flow ranges in which an upper flow rate to lower flow rate ratio ("target flow ratio") is 10 or greater, preferably 30 or greater, more preferably 50 or greater, and even more preferably in a range of 10 to 80. In some embodiments, the target flow ratio corresponds to the rated flow range of the proportioner 160, which can be, for example, 50 gpm to 3000 gpm for an exemplary eight-inch proportioner, 30 gpm to 2000 gpm for an exemplary six-inch proportioner, or some other rated flow range. Similarly, the target concentration can be a range between 1% to 1.3% for a 1% foam concentrate, a range between 2% to 2.6% for a 2% foam concentrate, and a range between 6% to 6.9% for a 6% foam concentrate (to name just a few) for the target flow ratio, which can be, for example, the rated flow range of the proportioner 160 (e.g., flows between 50 gpm to 3000 gpm for an exemplary eight-inch proportioner, flows between 30 gpm to 2000 gpm for an exemplary six-inch proportioner, or some other rated flow range). Preferably, proportioner 160 is configured to maintain the target concentration for the target flow ratio (e.g., rated flow range of the proportioner 160) for foam concentrate viscosities greater than 1300 mPas, and more preferably for viscosities greater than or equal to 1500 mPas. In some embodiments, the proportioner 160 is configured to maintain the target concentration for the target flow ratio (e.g., rated flow range of the proportioner 160) for foam concentrate viscosities in a range between 1500 mPas to 3500 mPas, and more preferably in a range between 2000 mPas to 3000 mPas.

Figure 3A:
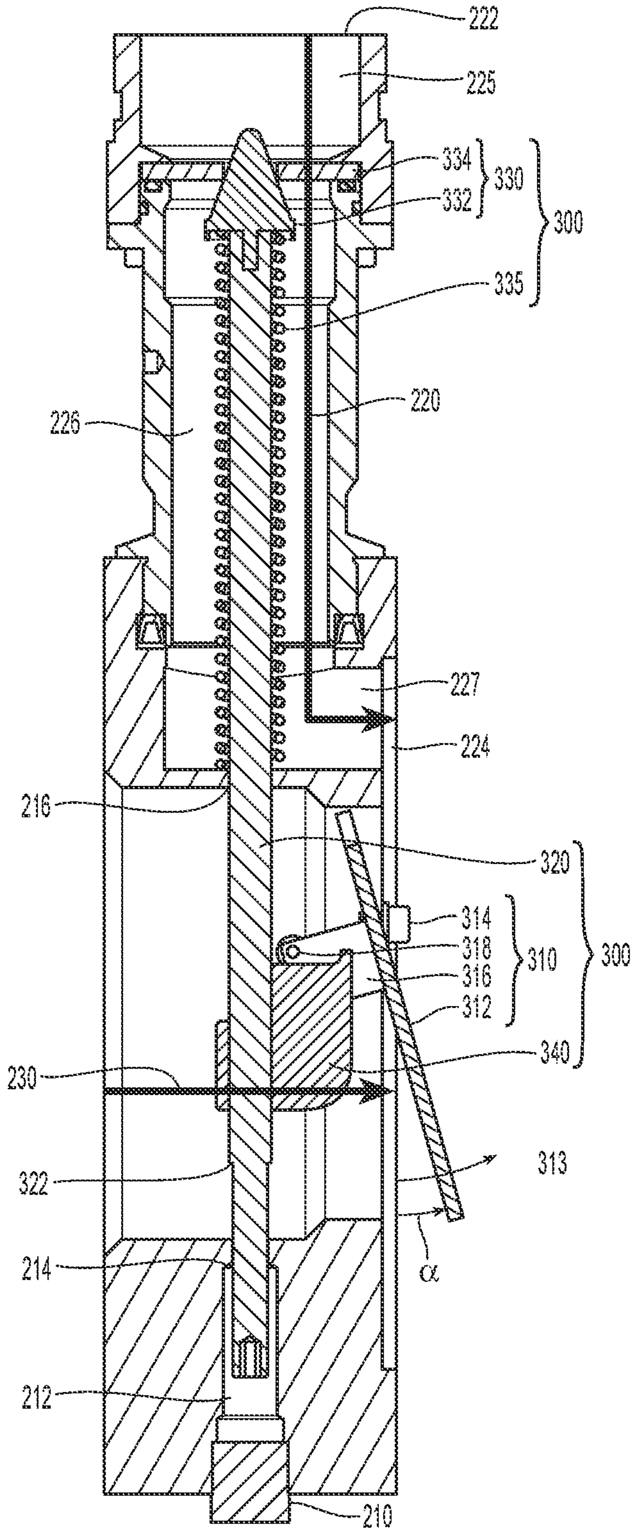
FIG. 3A is a cross-sectional side view of the proportioner of FIG. 2A.
Figure 3B:
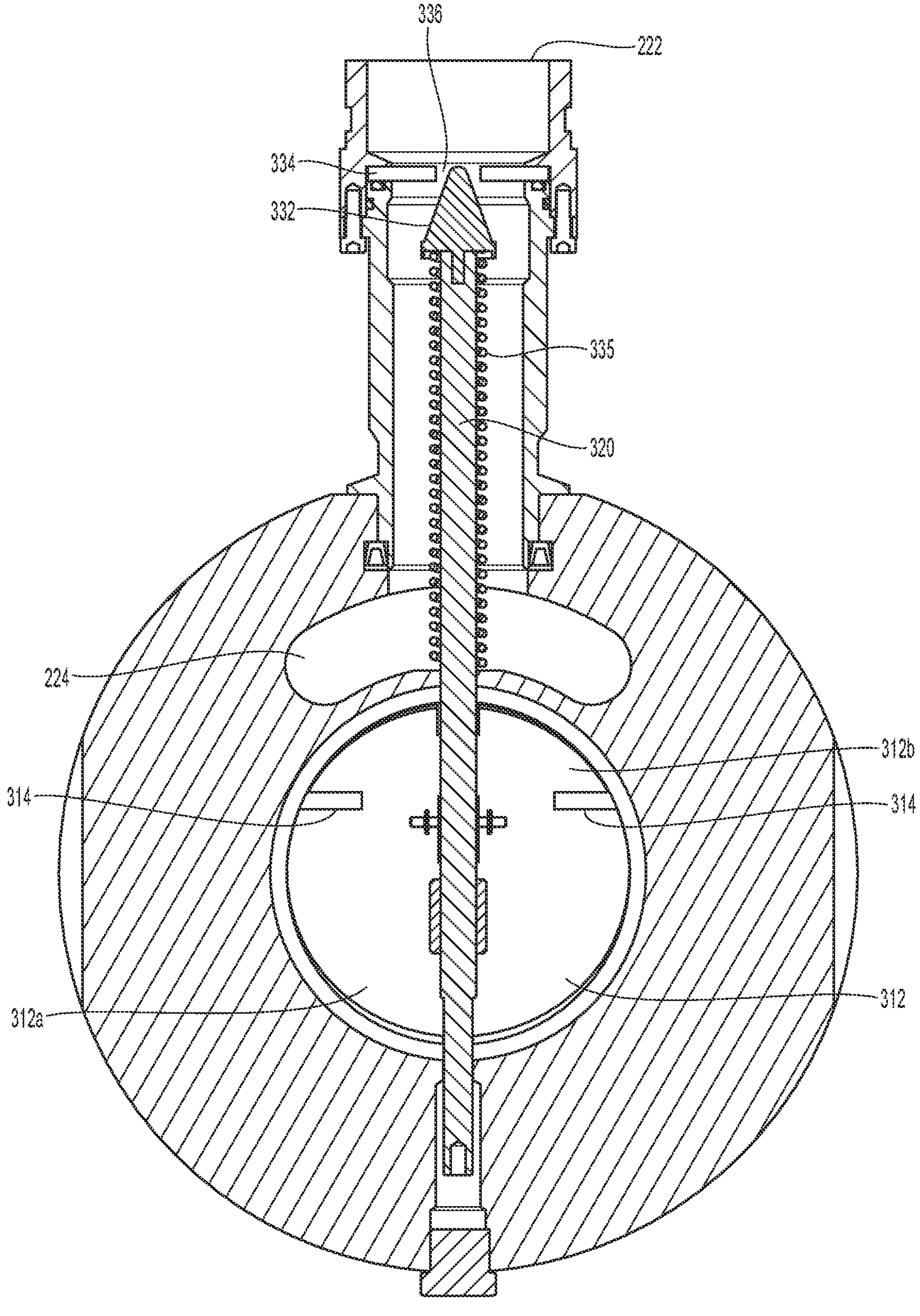
FIG. 3B is a cross-sectional front view of the proportioner of FIG. 2A.

FIGS. 3A and 3B illustrate side and front cross-sectional views of the proportioner 160. As best seen in FIG. 3A, the proportioner 160 preferably includes proportioning assembly 300 that regulates the flow of the foam concentrate in proportion to the fluid flow. In some embodiments, proportioning assembly 300 can include clapper assembly 310, rod member 320, restrictor assembly 330, spring member 335, and slider collar 340. In some embodiments, the restricting assembly 330 includes a restrictor disk 332 and an orifice plate 334. The orifice plate 334 is disposed in the foam passage 220 and preferably includes an opening 336. In some embodiments, a thickness of the orifice plate 334 is in a range of 0.10 inch to 0.30 inch and more preferably 0.20 inch. The opening 336 can have a diameter that is in a range of 0.25 inch to 2.0 inch. The diameter of the opening 336 can depend on the size of the proportioner 160. For example, for an exemplary six-inch proportioner, the diameter can be in a range of 0.60 inch to 0.80 inch, and preferably, 0.73 inch. For an exemplary eight-inch proportioner, the diameter can be in a range of 0.85 to 1.0 inch, and preferably, 0.94 inch. Preferably, in operation, the foam concentrate flows through the opening 336 of the orifice plate 334. In some embodiments, the orifice plate 334 is disposed in the neck portion 204. The opening 336 can be, for example, a circular opening. However, in other exemplary embodiments of the disclosure, the opening 336 can have other shapes such as, for example, a rectangular shape, triangular shape, or some other shape.

Figure 3C:
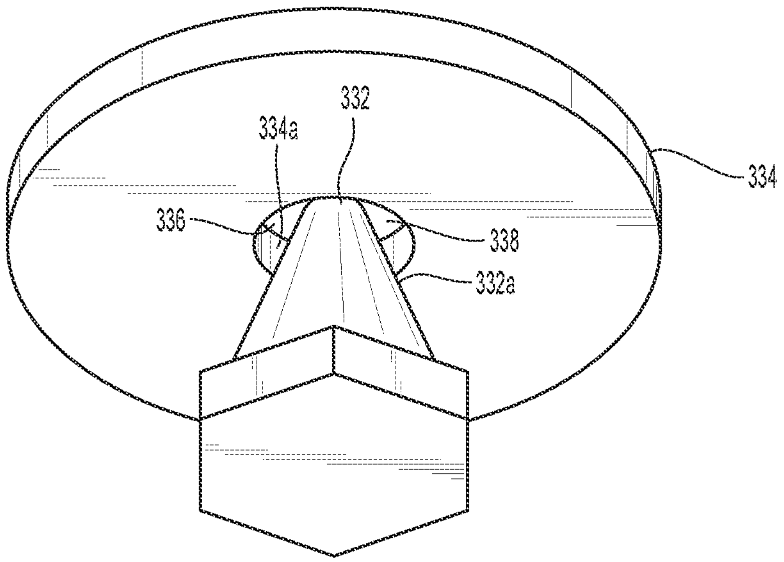
FIG. 3C is a bottom perspective view of the orifice plate and the restrictor disk of the proportioner of FIG. 2A.

Preferably, the restrictor disk 332 is disposed on the opposite side of the orifice plate 334 to restrict the flow of the foam concentrate through the opening 336. For example, the opening 336 can be configured to receive at least a portion of the restrictor disk 332 such as, for example, the tip of the restrictor disk 332 to block at least a portion of the foam concentrate flow. FIG. 3C is a bottom perspective view of the orifice plate 334 and the restrictor disk 332. For clarity, other elements of the proportioner 160 are not shown. As seen in FIG. 3C, in some embodiments, the arrangement of the restrictor disk 332 and the opening 336 forms an annulus 338 at the exit side of the opening 336, which is defined by the interior surface 334*a* of the orifice plate 334. The annulus 338 is defined by an outer surface 332*a* of the restrictor disk 332 and the interior surface 334*a*. Preferably, as the distance between a base of the restrictor disk 332 and the orifice plate 334 increases, a cross-sectional area of the annulus 338 increases. That is, the cross-sectional area of the annulus 338 (also referred to herein as "flow cross-sectional area" of the annulus 338) is the opening area "seen" by the concentrate as the concentrate flows from through passageway 225 into through passageway 226. Preferably, the distance between the base of the restrictor disk 332 and the orifice plate 334 and thus the flow cross-sectional area of the annulus 338 is regulated to control the flow of the foam concentrate through the opening 336. For example, in some embodiments, when the restrictor disk 332 is in a full close position, the restrictor disk 332 can be configured to make contact with the bottom of the orifice plate 334 such that a flow cross-sectional area of the annulus 338 is zero (e.g., the opening 336 is fully blocked) to prevent the flow of the foam concentrate. In some embodiments, when the restrictor disk 332 is in a full close position, the flow cross-sectional area of the annulus 338 is greater than zero (e.g., at least a portion of the opening 336 is still open) in order to, for example, provide a minimum foam concentrate flow. Preferably, a concentrate control valve (not shown) is coupled to the foam inlet 222 of the proportioner 160 to isolate the foam concentrate from the proportioner 160 when the proportioner 160 is not in operation. The concentrate control valve can open when the fire protection system activates and closes when the fire protection system is shut down. In some embodiments, the restrictor assembly 330 maintains the annulus 338 for the full travel range of the restrictor disk 332. That is, a portion of the restrictor disk 332 remains disposed within the opening 336 of the orifice plate 334 for a full travel range of the restrictor disk 332. In some embodiments, the restrictor disk 332 can travel such that the restrictor disk 332 is completely disposed outside the opening 336. In these embodiments, the annulus 338 is not maintained for the entire travel range of the restrictor disk 332.

In operation, as the fluid flow (e.g., water flow) in the fire protection system varies, the proportioning assembly 300 is configured to move the restrictor disk 332 relative to the orifice plate 334 such that a restriction of the foam concentrate flow changes to regulate the flow of the foam concentrate. Preferably, as the restrictor disk 332 moves away from the opening 336, the restrictor disk 332 provides less of a flow restriction and the flow of the foam concentrate increases, and as the restrictor disk 332 moves toward the opening 336, the restrictor disk 332 provides more of a flow restriction and the flow of the foam concentrate decreases. In some embodiments, at least a portion of the restrictor disk 332 can have a tapered shape. Preferably, the tapered shape is such that a width of the restrictor disk 332 narrows going from the base of the restrictor disk 332 towards the tip of the restrictor disk 332 (e.g., the portion closes to the orifice plate 334). The shape of the restrictor disk 332 preferably corresponds to the shape of the orifice plate 334. For example, for a circular opening 336, the tapered shape of the restrictor disk 332 can be a conical shape. For openings with other shapes such as, for example, rectangular, triangular, or another shape, the restrictor disk is appropriately shaped to control the flow through the opening of the orifice plate.

Figure 4B:
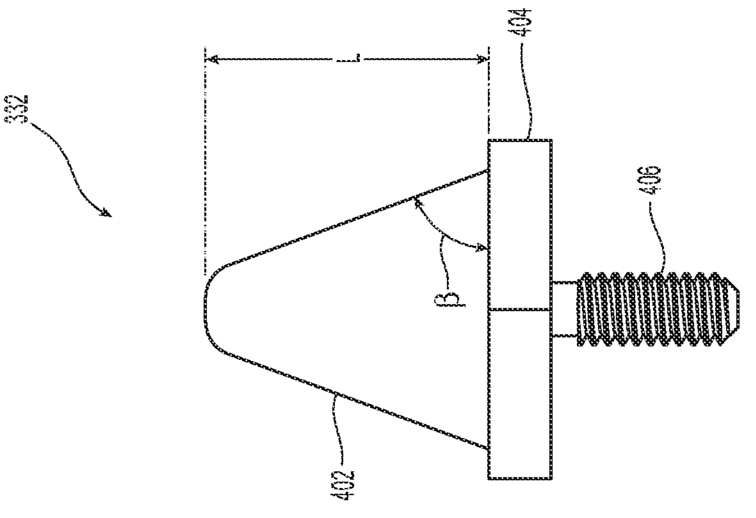
FIG. 4B is a side view of the restrictor disk of FIG. 4A.
Figure 4A:
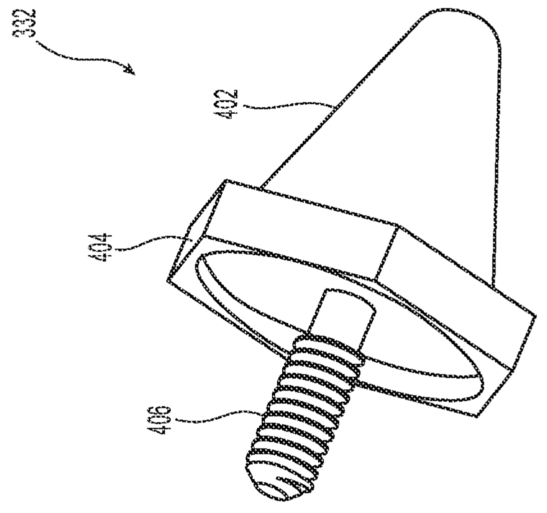
FIG. 4A is a perspective view of a preferred restrictor disk that can be used in the proportioner of FIG. 2A.

As seen in FIGS. 4A and 4B, in some embodiments, the restrictor disk 332 can include a tapered section 402 that has a conical shape, a base 404, and a connector 406. In some embodiments, the base 404 is not included and the tapered section 402 transactions directly to the connector 406. The slope of the tapered section 402 with respect to the base 404 of the restrictor disk 332 can be in a range of 65 degrees to 80 degrees (see angle β in FIG. 4B) and the length L can be in a range of 0.5 inch to 1.5 inch, more preferably 0.9 to 1.1 inches., and even more preferably 1.0 inch. Preferably, the slope angle β is based on the size of the proportioner and/or the mix ratio value of the foam concentrate. For example, the slope angle β can be 70±2 degrees for an exemplary eight-inch proportioner and 75±2 degrees for an exemplary six-inch proportioner.

In some embodiments, the base 404 of the restrictor disk 332 has a configuration that facilitates installation onto the rod member 320. For example, as seen in FIGS. 4A and 4B, the base 404 can be configured so that a wrench or other tool can be used to insert the restrictor disk 332 onto the rod member 320. Preferably, the base 404 is hex-shaped. Of course, the base 404 is not limited to a hex-shape and can have other shapes. Preferably, the base 404 is configured to be a stop for one end of the biasing member 335. The biasing member 335, which is explained in more detail below, can be configured to bias the proportioning assembly 300 in the closed direction.

In some embodiments, the connector 406 can be in the shape of a threaded bolt that threads into a corresponding threaded channel in the rod member 320. In other exemplary embodiments, the connector 406 can be a threaded channel (not shown) that extends into the base 404 and/or the tapered section 402. The threaded channel can connect to a threaded bolt-shaped connector (not shown) on the rod member 320. When proportioning assembly 300 is assembled, the rod member 320 and restrictor disk 332 are moved by the clapper assembly 310 in proportion to the fluid flow (e.g., water flow) as discussed in more detail below.

Figure 5:
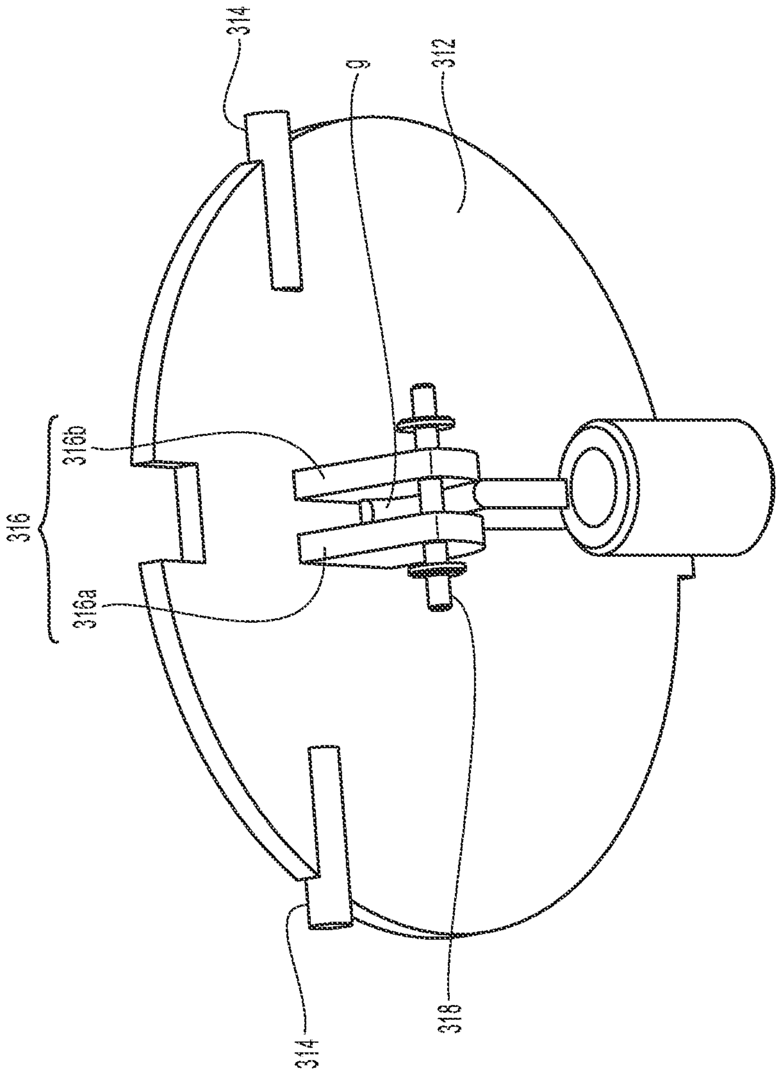
FIG. 5 is perspective view of a preferred interface between a preferred clapper and a preferred slider collar that can be used in the proportioner of FIG. 2A.

Turning to FIGS. 3A and 3B, the clapper assembly 310 can include a clapper plate 312 that is attached to the body portion 202 using hinges 314. The hinges 314 are disposed on the upper portion of the clapper plate 312 about midway between the horizontal diameter of the clapper plate 312 and the top of the clapper plate 312. The hinges 314 form an axis that is perpendicular to the direction of fluid flow and allow the clapper plate 312 to rotate whenever the fluid flow presses against the lower portion **312*a* of the clapper plate 312. When the fluid presses against the lower portion 312*a* of the clapper plate 312, the lower portion 312*a* rotates outward with the fluid flow, and the upper portion 312*b* rotates inward against the fluid flow. As seen in FIG. 5, the clapper assembly 310 also includes a clapper bracket 316 and pin 318. The clapper bracket 316 attaches to the upstream side of the clapper plate 312 by, for example, welding, screws, or some other fastening means. In some embodiments, the bracket can be integral with the clapper plate 312 (e.g., by using milling and/or forging methods). In some embodiments, the clapper bracket 316 includes two bracket portions 316*a* and 316*b* that are disposed parallel to each other with a gap g therebetween. The pin 318 is preferably configured to slide through opening in the bracket portions 316*a* and 316*b*. The pin 318 can be secured to the bracket portions 316*a* and 316*b* by press fit, c-clip, cotter pin, or by some other fastening means. The interface between the bracket portions 316*a*, 316*b* and pin 318 can include washers, if needed. The clapper bracket 316 with pin 318 and a slider collar 340, which is connected to the rod member 320, are arranged such that a sliding interface is formed between the pin 318 and the slider collar 340**.

An embodiment of the slider collar 340 (see FIG. 6A) includes a cylindrical portion 342 and a slider joint bracket 344. The cylindrical portion 342 preferably has a channel 343 passing through the longitudinal portion of the cylindrical portion 342 to receive the rod member 320. In some embodiments, slider collar 340 is adjustably attached the rod member 320 in order to position the slider collar 340 on the rod member 320 such that the proportioning assembly 300 is calibrated. For example, the slider collar 340 is positioned on the rod member 320 such that the sliding linkage between the clapper assembly 310 and slider collar 340 is calibrated to move the rod member 320 in proportion to the movement of the clapper assembly 310. Preferably, the channel 343 of the slider collar 340 is threaded and at least a portion of the rod member 320 corresponding to a range of positional adjustments for the slider collar 340 has matching threads. In addition to the position of the slider collar 340, preferably, the biasing constant (e.g., spring constant) of the biasing member 335 determines the range of movement of the clapper plate 312 with respect to the fluid flow (e.g., water flow) and thus the range of movement of the rod member 320. In some embodiments, instead of an adjustable interface, the slider collar 340 can be fixedly attached to the rod member 320 by an interference fit, welding, screws, or some other fastening means. In such embodiments, the position of the slider collar 340 on the rod member 320 can be factory calibrated.

Figure 6B:
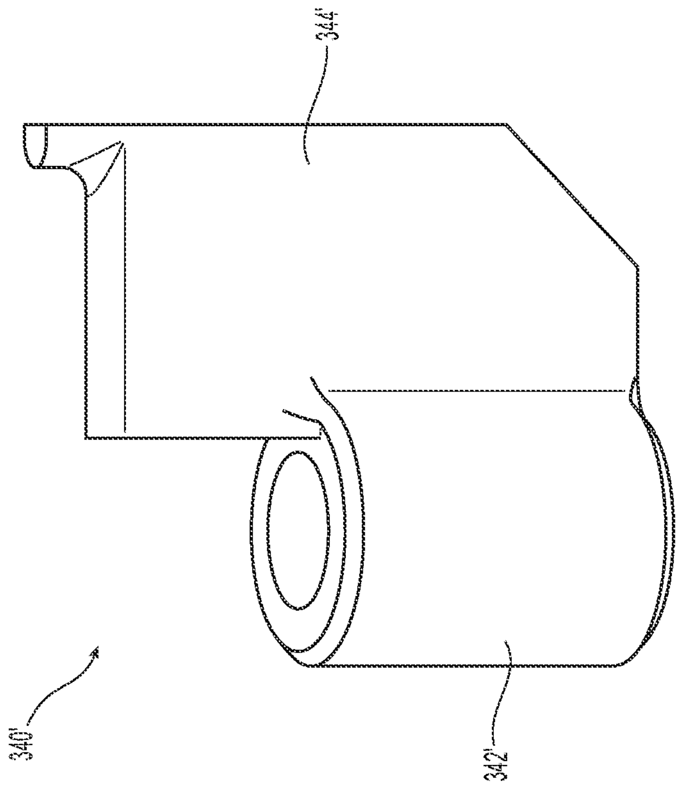
FIGS. 6A and 6B are preferred embodiments of slider collars that can be used in the proportioner of FIG. 2A.
Figure 6A:
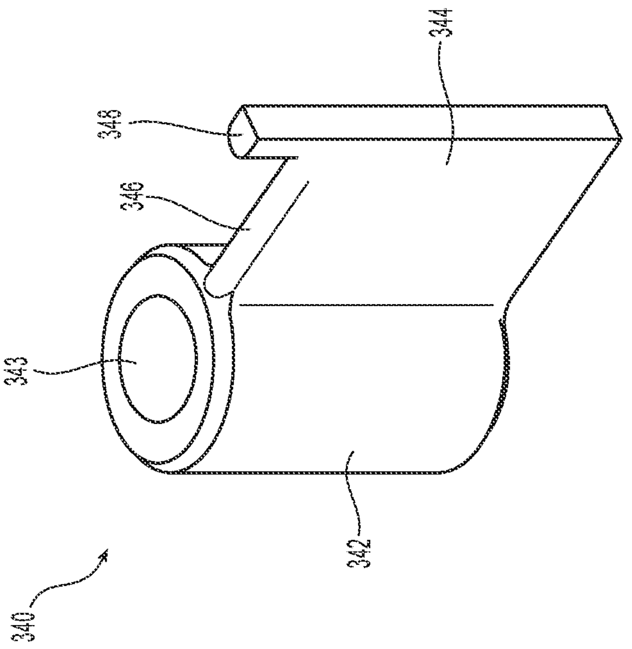

FIG. 5 illustrates an exemplary linkage between the slider collar 340 and clapper bracket 316. As seen in FIG. 5, the slider joint bracket 344 of the slider collar 340 is disposed in the gap g formed by the two bracket portions **316*a* and 316*b* of the clapper bracket 316. Preferably, when the clapper plate 312 is rotated open (see direction of arrow 313 in FIG. 3A), the pin 318 is pressed against a top surface 346 of the slider joint bracket 344. Preferably, the clapper plate 312 can be rotated open to an angle $\alpha$ that can be up to 60 degrees, and more preferably up to 48 degrees. In operation, as the clapper plate 312 rotates open, the pin 318 preferably slides along the top surface 346 while applying a downward force on the slider collar 340. In some embodiments, the clapper plate 312 rotates a minimum amount before the pin 318 contacts the top surface 346 and provides the downward force. For example, the minimum amount can be an angle $\alpha$ in a range of 0.5 degrees to 5 degrees, and preferably 3 degrees before the pin 318 contacts and applies a downward force on slider collar 340. The downward force moves the slider collar 340 and thus the rod member 320 in an open direction with respect to the restrictor assembly 330. As the fluid flow increases and the clapper plate 312 rotates even further in the open direction, the pin 318 keeps sliding along the top surface 346 of the slider joint bracket 344 until the pin 318 hits the pin stop 348. Preferably, the pin stop 348 is a raised portion along the top surface 346 of the slider joint bracket 344. In the embodiment of FIG. 6A, the top and bottom surfaces of the cylindrical portion 342 of the slider collar 340 are flush with the top surface 346 and the bottom surface of the slider joint bracket 344. Because the pin 318 slides along the top surface 346, the pin 318 and/or the slider collar 340 can be subject to wear. To minimize the wear, the pin 318 and/or the slider collar 340 can be hardened. In another embodiment, slider collar 340' has a slider joint bracket 344' that is longer than the cylindrical portion 342'. The longer slider joint bracket 344' can be used, for example, when adjustment of the slider collar on the rod member 320 may be limited. Because those skilled in the art understand that the slider collar 340' functions in a similar way as the slider collar 340, for brevity, the function of slider collar 340'** is not discussed further.

As discussed above, when the clapper plate 312 moves such that the angle $\alpha$ increases, the restrictor disk 332 of the restrictor assembly 330 is moved in the open direction (e.g., away from the orifice plate 334) to increase the flow cross-sectional area of the annulus 338. The travel of the restrictor disk 332 corresponding to the minimum angle $\alpha$ to the full open angle $\alpha$ can be in a range of 0.30 inch to 0.75 inch. Preferably, the flow cross-sectional area of annulus 338 when the restrictor disk 332 is in the full close position (minimum angle $\alpha$) can be in a range of 0 to 40%, more preferably 25% to 35%, and even more preferably 30%, of the area of the opening 336. In some embodiments, the flow cross-sectional area of annulus 338 when the restrictor disk 332 is in the full open position (full open angle α) can be in a range of 60% to 95% of the area of the opening 336. The amount the clapper plate 312 rotates and/or the amount the restrictor disk 332 travels from the full close position to the full open position can be dependent on the size of the proportioner 160. Similarly, the flow cross-sectional area of the annulus 338 at the full close position and/or at the full open position can be dependent on the size of the proportioner 160.

For example, for an eight-inch proportioner, when the restrictor disk 332 is in the closed position, the clapper plate 312 can be at a minimum angle α, which can be in a range of 0 to 5 degrees, and preferably approximately 3 degrees. When the restrictor disk 332 of the exemplary eight-inch proportioner is in the full open position, the clapper plate 312 can be at a full open angle α that is in a range of 55 degrees to 65 degrees and, preferably approximately 60 degrees. The travel of the restrictor disk 332 corresponding to the minimum angle α to the full open angle α can be in a range of 0.65 inch to 0.75 inch, and preferably 0.7 inch, for the exemplary eight-inch proportioner. Preferably, the flow cross-sectional area of annulus 338 when the restrictor disk 332 is in the full close position (minimum angle α) can be in a range of 0 to 40%, more preferably 25% to 35%, and even more preferably 30%, of the area of the opening 336 and the flow cross-sectional area of annulus 338 when the restrictor disk 332 is in the full open position (full open angle α) can be in a range of 85% to 95%, and more preferably 90%, of the area of the opening 336.

For an exemplary six-inch proportioner, when the restrictor disk 332 is in the closed position, the clapper plate 312 can be at a minimum angle α, which can be in a range of 0 to 5 degrees, and preferably approximately 3 degrees. When the restrictor disk 332 of the exemplary six-inch proportioner is in the full open position, the clapper plate 312 can be at a full open angle α that is in a range of 40 degrees to 50 degrees and, preferably approximately 47 degrees. The travel of the restrictor disk 332 corresponding to the minimum angle α to the full open angle α can be in a range of 0.30 inch to 0.35 inch, and preferably 0.33 inch, for the exemplary six-inch proportioner. Preferably, the flow cross-sectional area of annulus 338 when the restrictor disk 332 is in the full close position (minimum angle α) can be in a range of 0 to 40%, more preferably 25% to 35%, and even more preferably 30%, of the area of the opening 336, and the flow cross-sectional area of annulus 338 when the restrictor disk 332 is in the full open position (full open angle α) can be in a range of 60% to 70%, and more preferably 65%, of the area of the opening 336.

Turning to FIG. 3A, as the pin 318 pushes down on the slider collar 340, the rod member 320 is also pushed down because the slider collar 340 and the rod member 320 are attached, as discussed above. As the rod member 320 moves, the rod member 320 can be guided such that the restrictor disk 332, which is attached to the rod member 320, is aligned with the opening 336 of the orifice plate 334. Preferably, the proportioner 160 includes one or more guides to keep the rod member 320 aligned with the orifice plate 334 as the rod member 320 is moved. Preferably, the proportioner 160 includes two guides, a lower guide 214 and an upper guide 216, that are disposed in the body portion 202. Preferably, the slider collar 340 and thus the sliding interface is disposed between the two guides. For example, the lower guide 214 is disposed below the slider collar 340 and the upper guide 216 is disposed above the slider collar 340. The placement of the guides on either side of the sliding interface can provide for a more robust linkage than in conventional proportioners.

In some embodiments, the guides 214, 216 are openings in the body portion 202 that allow the rod member 320 to pass through. The diameters of the guide openings are preferably slightly larger than the diameters of the rod member 320 at the respective locations but no so large as to allow the rod member 320 and thus the restrictor disk 332 to get misaligned. Preferably, the diameter of the rod member 320 extending into the lower guide 214 is smaller than a diameter of an upper portion of the rod member 320 and, preferably, includes a transition portion 322. In some embodiments, either one or both guides 214, 216 can include sleeves, collars, bearings, or some other component disposed in and/or adjacent the guides 214, 216 to minimize the friction as the rod member 320 moves.

As seen in FIG. 3A, the lower portion of the rod member 320 extends past the guide 214 and into channel 212. The channel 212 can extend from the exterior of the body portion 202 to the guide 214. Preferably, the channel 212 has a diameter that is larger than that of the opening of guide 214. A plug 210 covers the channel 212 during normal operation. The plug 210 can be removed in order to access the rod member 320 to calibrate the position of the slider collar 340 on the rod member 320. For example, with the plug 210 removed, the rod member 320 can be rotated so as to change the position of the slider collar 340 along the longitudinal axis of the rod member 320. Preferably, the end of the rod member 320 in the channel 212 is slotted and/or has a geometry that facilitates use of a tool (e.g., screwdriver, nut driver, or some other tool) to turn the rod member 320.

As discussed above, the proportioner 160 includes a biasing member 335 that determines the movement of the clapper plate 312 and biases the restrictor assembly 330 to the closed position. Preferably, when in the closed position, the biasing member 335 provides a force in a range of 40 lbs to 60 lbs, depending on the size of the proportioner to ensure the proportioner 160 is closed. Of course, as discussed above, the closed position can still provide for a minimum foam concentrate flow by, for example, leaving a gap between the restrictor disk 332 and the orifice plate 334. For example, when the fire protection system is activated and the concentrate control valve is open, the gap between the restrictor disk 332 and the orifice plate 334 provides for a minimum concentrate flow because the cross-sectional area for the annulus 338 is greater than zero. In some embodiments, the biasing member 335 can be a spring. Preferably, a spring constant for the spring can be in a range of 15 lbs/in to 50 lbs/in and preferably 15 lbs/in to 40 lbs/in, depending on the size of the proportioner. For example, the spring constant can be 38±1 lbs/in for an exemplary eight-inch proportioner, 25±1 lbs/in for an exemplary six-inch proportioner, and 16±1 lbs/in for an exemplary six-inch proportioner. In some embodiments, for example as seen in FIG. 3A, one end of the biasing member 335 (e.g., spring) presses against the upper guide 216 or another fixed location on the body portion 202 and the other end of the biasing member 335 (e.g., spring) presses against the base 404 of the restrictor disk 332 or another location on the restrictor disk 332 and/or the rod member 320. In some embodiments, the biasing member 335 (e.g., spring) is disposed such that the biasing member 335 (e.g., spring) circumscribes the rod member 320. Preferably, a protective sleeve (not shown) can be disposed between the biasing member 335 (e.g., spring) and the rod member 320 for wear protection and/or to prevent interference that can adversely affect operation of the proportioning assembly 300.

In operation, as the fluid flow goes from 0 to full flow, the clapper plate 312 will rotate open from a minimum angle α, as discussed above, and the rod member 320 is pushed down by pin 318 via slider collar 340. As the rod member 320 is pushed down, the restrictor disk 332 moves away from orifice plate 334 to increase the flow cross-sectional area of annulus 338 and thus the foam concentrate flow such that foam concentration in the fire protection solution is within the target concentration. In some embodiments, the flow cross-sectional area of annulus 338 reaches the full open value prior to the fire protection fluid reaching the full rated flow. Preferably, depending on the size of the proportioner 160, the cross-sectional area of the annulus 338 can reach a maximum when the fluid flow is as low as 25% of the rated flow to as high as 95% of the rated flow. For example, for an exemplary eight-inch proportioner, the flow cross-sectional area of the annulus 338 can reach a maximum that is in a range of 85% to 95%, and more preferably 90%, of the area of the opening 336 when the fluid flow is approximately 60% to 70%, and preferably approximately 67% of the rated flow of the proportioner. Similarly, for an exemplary six-inch proportioner, the flow cross-sectional area of the annulus 338 can reach a maximum that is in a range of 60% to 70%, and more preferably 65%, of the area of the opening 336 when the fluid flow is approximately 20% to 30%, and preferably approximately 25% of the rated flow of the proportioner. Although the flow cross-sectional area of annulus 338 reaches a maximum prior to the fire protection solution reaching the full rated flow in these embodiments, the fire protection fluid flow and thus the foam concentrate flow can still increase based on the number of fire protection devices (e.g., sprinklers, nozzles, monitors, or some other discharge devices) that are open. This is because, as discussed above, as the fire protection fluid flow increases in the fire protection system 100, the pressure used to discharge the foam concentrate and/or the venturi effect of the increased flow through the proportioner 160 ensure that the foam concentrate flow increases to keep the foam concentrate percentage with the target concentration. In addition to the pressure, the shape of the restrictor disk 332 and/or the outer diameter of opening 336 of orifice plate 334 will have an affect on the flow through the proportioner 160.

Figure 7:
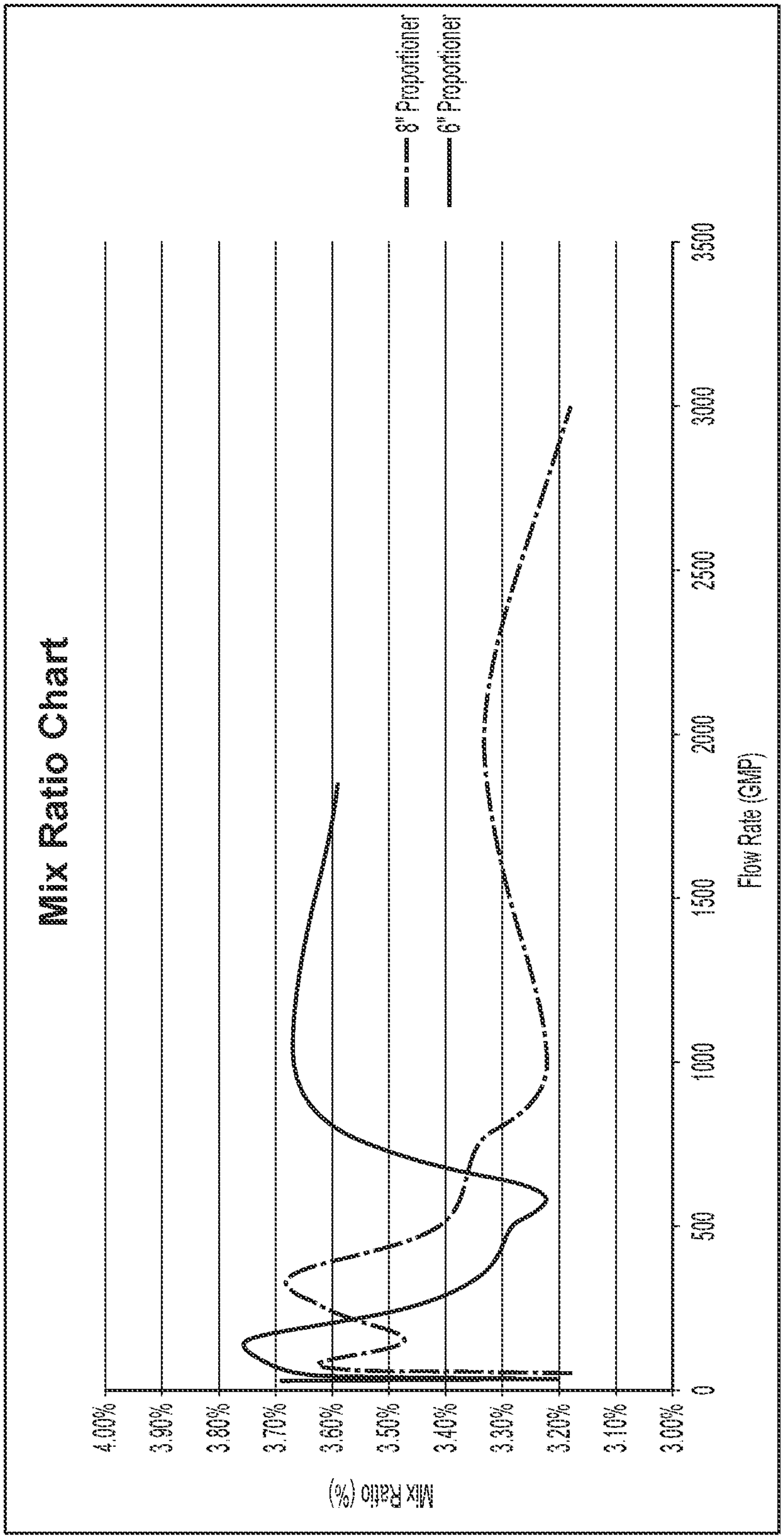
FIG. 7 is a performance plot for the Mix Ratio of an exemplary eight-inch proportioner and an exemplary six-inch proportioner.

As discussed above, the proportioner assembly 300 is configured to maintain any variation in the foam concentrate percentage in the fire protection solution to an effective fire protection value. For example, as seen in the Mix Ratio chart of FIG. 7, for a 3% foam concentrate, for both an exemplary eight-inch proportioner and an exemplary six-inch proportioner, the variation in the foam concentrate percentage in the fire protection solution (mix ratio) is in the target concentration range between 3% and 3.9% for the rated flow ranges of both the 6" proportioner (e.g., 30 gpm to 2000 gpm) and the 8" proportioner (e.g., 50 gpm to 3000 gpm).

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed:

1. A proportioner, comprising:

a body portion, the body portion defining, a foam passage for transporting a foam concentrate, and a fluid passage for transporting a fire protection fluid;

a restrictor assembly having a restrictor disk and an orifice plate, the orifice plate having an opening for receiving the restrictor disk, the restrictor assembly configured such that a flow of the foam concentrate through the foam passage is based on a distance of the restrictor disk from the orifice plate;

a rod member connected to the restrictor disk;

a first guide configured to accept the rod member, the first guide disposed in the body portion to position the rod member so as to align the restrictor disk to the orifice plate; and a clapper assembly connected to the rod member via a sliding interface, the clapper assembly configured to control a flow of the foam concentrate through the foam passage in proportion to a flow of the fire protection fluid through the fluid passage by moving the rod member to vary the distance between the restrictor disk and the orifice plate;

wherein the sliding interface is disposed within the fluid passage, and wherein at least a portion of the restrictor disk is disposed in the opening.

2. The proportioner of claim 1, wherein the restrictor disk includes a tapered section that has a slope with an angle in a range of 65 degrees to 85 degrees with respect to a base of the restrictor disk.

3. The proportioner of claim 2, wherein the clapper assembly is configured to move the rod member so as to maintain a foam concentrate percentage in a fire protection solution within a target concentration that provides effective fire protection, the fire protection solution being a mixture of the foam concentrate and the fire protection fluid.

4. The proportioner of claim 3, wherein the target concentration is maintained for flows of the fire protection solution between 30 gpm to 2000 gpm.

5. The proportioner of claim 3, wherein the target concentration is maintained for flows of the fire protection solution between 50 gpm to 3000 gpm.

6. The proportioner of claim 3, wherein the target concentration is based on a rated foam concentrate percentage.

7. The proportioner of claim 6, wherein the target concentration is a range having a lower value that is the rated foam concentrate percentage.

8. The proportioner of claim 7, wherein the target concentration range has an upper value that is a lesser of the rated foam concentrate percentage plus 0.9% or the rated foam concentrate percentage plus 0.3 * the rated foam concentrate percentage.

9. The proportioner of claim 7, wherein, when the rated foam concentration percentage is 3 * the target concentration is a range between 3% to 3.9%.

10. The proportioner of claim 9, wherein a viscosity of the foam concentrate is greater than 1300 mPas.

11. The proportioner of claim 9, wherein a viscosity of the foam concentrate is in a range between 1500 mPas to 3500 mPas.

12. The proportioner of claim 11, wherein the viscosity range is between 2000 mPas to 3000 mPas.

13. The proportioner of claim 3, further comprising:

a slider collar connected to the rod member, wherein the sliding interface between the clapper assembly and the rod member is formed by a pin of the clapper assembly sliding on a surface of the slider collar.

14. The proportioner of claim 13, wherein the clapper assembly includes a clapper plate that is configured to rotate in proportion to a flow of the fire protection fluid.

15. The proportioner of claim 14, wherein a spring biases the restrictor disk towards the orifice plate.

16. The proportioner of claim 15, wherein the spring comprises a spring constant that is in a range between 15 lbs/in to 40 lbs/in.

17. The proportioner of claim 1, wherein the foam passage includes a foam output and the fluid passage includes a fluid output, and wherein a ratio of a cross-sectional area of fluid output to a cross-sectional area of the foam output is 11 or less.

18. The proportioner of claim 1, wherein the restrictor disk is conical shaped.

19. The proportioner of claim 17, wherein the ratio is in a range between 2 to 10.

20. The proportioner of claim 19, wherein the range is between 2 to 4.

21. The proportioner of claim 19, wherein the clapper assembly is configured to move the restrictor disk so as to maintain a foam concentrate percentage in a fire protection solution within a target concentration that provides effective fire protection for flows of the fire protection solution within a target flow ratio in a range of 10 to 80, and wherein the fire protection solution is a mixture of the foam concentrate and the fire protection fluid.

22. The proportioner of claim 19, wherein the restrictor disk and the opening are arranged to form an annulus between an outer surface of the restrictor disk and an inner surface of the opening when at least a portion of the restrictor disk is disposed within the opening, and wherein the restrictor assembly maintains the annulus for a full travel range of the restrictor disk from a full closed position to a full open position of the proportioner.

23. The proportioner of claim 1, wherein the clapper assembly is configured to move the restrictor disk so as to maintain a foam concentrate percentage in a fire protection solution within a target concentration that provides effective fire protection for flows of the fire protection solution within a target flow ratio in a range of 10 to 80, and wherein the fire protection solution is a mixture of the foam concentrate and the fire protection fluid.

24. The proportioner of claim 1, wherein the restrictor disk and the opening are arranged to form an annulus between an outer surface of the restrictor disk and an inner surface of the opening when at least a portion of the restrictor disk is disposed within the opening, and wherein the restrictor assembly maintains the annulus for a full travel range of the restrictor disk from a full closed position to a full open position of the proportioner.

25. The proportioner of claim 13, wherein the clapper assembly is configured to move the restrictor disk so as to maintain a foam concentrate percentage in a fire protection solution within a target concentration that provides effective fire protection for flows of the fire protection solution within a target flow ratio in a range of 10 to 80, and wherein the fire protection solution is a mixture of the foam concentrate and the fire protection fluid.

26. The proportioner of claim 25, wherein the restrictor disk and the opening are arranged to form an annulus between an outer surface of the restrictor disk and an inner surface of the opening when at least a portion of the restrictor disk is disposed within the opening, and wherein the restrictor assembly maintains the annulus for a full travel range of the restrictor disk from a full closed position to a full open position of the proportioner.

27. The proportioner of claim 14, wherein the clapper assembly is configured to move the restrictor disk so as to maintain a foam concentrate percentage in a fire protection solution within a target concentration that provides effective fire protection for flows of the fire protection solution within a target flow ratio in a range of 10 to 80, wherein the fire protection solution is a mixture of the foam concentrate and the fire protection fluid, wherein the restrictor disk and the opening are arranged to form an annulus between an outer surface of the restrictor disk and an inner surface of the opening when at least a portion of the restrictor disk is disposed within the opening, and wherein the restrictor assembly maintains the annulus for a full travel range of the restrictor disk from a full closed position to a full open position of the proportioner.

* * * * *